April 2, 1935.  L. CROMIS  1,996,147

ENGINE

Filed July 27, 1934

Inventor
Lloyd Cromis
By Rector, Hibben, Davis and Macauley Atty.

Patented Apr. 2, 1935

1,996,147

UNITED STATES PATENT OFFICE 1,996,147

ENGINE

Lloyd Cromis, Hagerstown, Ind., assignor to The Perfect Circle Company, Hagerstown, Ind., a corporation of Indiana Application July 27, 1934, Serial No. 737,196

2 Claims. (Cl. 309—45)

This invention relates to piston rings and more particularly to oil control or regulating rings for internal combustion engines.

The principal object of my invention is to provide in combination with the piston and the cylinder an improved oil control ring which will materially reduce the consumption of oil and also reduce "blow-by", that is leakage of the combustible and compressed gases passed the piston.

My invention will be more fully explained by reference to the accompanying drawing, in which.

Figure 1:
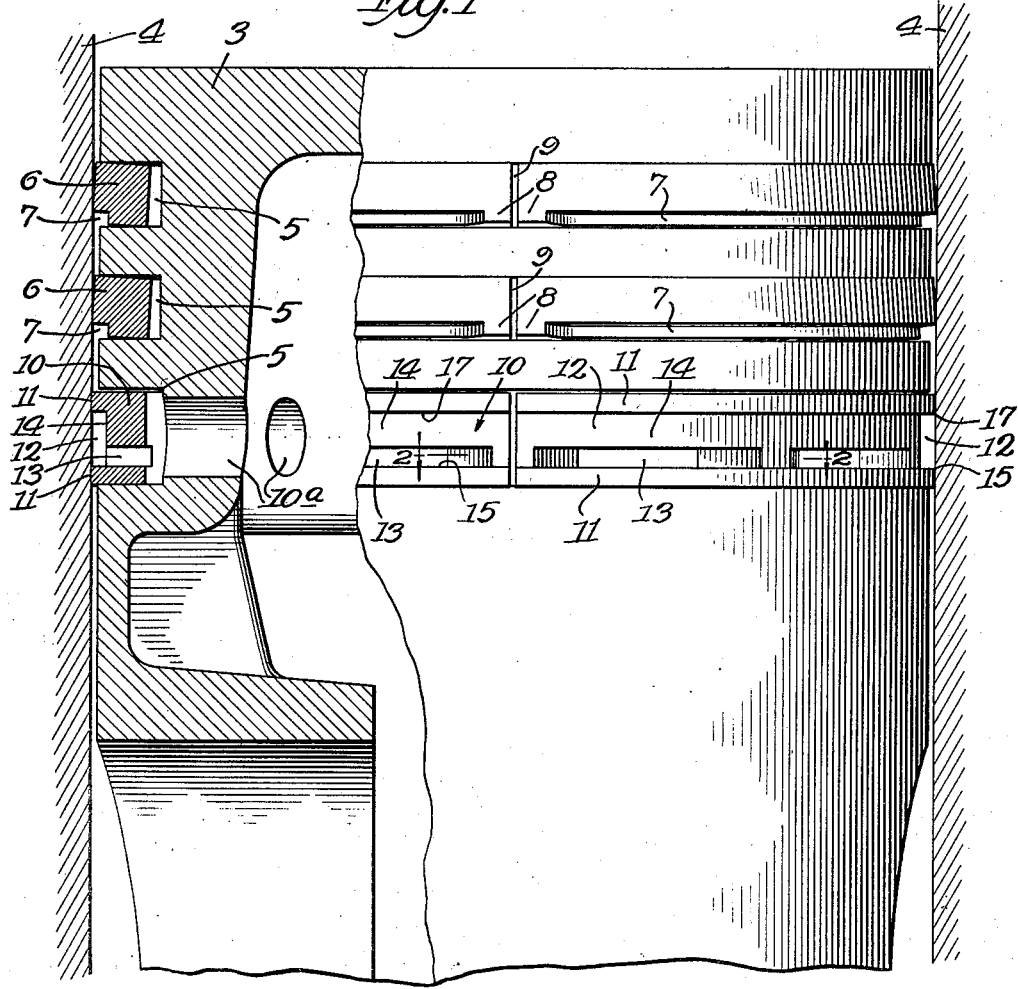
Fig. 1 is a side elevation of a piston and piston rings, one of which embodies the preferred form of my invention, the piston and rings being broken away to show parts of them in section and portions of the engine cylinder also being shown in section.
Figure 2:
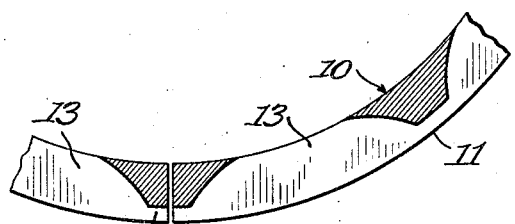
Fig. 2 is a detail fragmentary section through the oil control piston ring as on the line 2—2 of Fig. 1.

The piston 3, which reciprocates within the engine cylinder 4, is provided with grooves 5 in the upper two of which are mounted compression rings 6, preferably such as disclosed in Paton Patent No. 1,919,183, the rings having grooves 7 in their lower outer corners with dam portions 8 adjacent the joints or gaps 9 in the rings.

The two upper grooves 5 are imperforate but the back of the lowest groove 5 is provided with a series of apertures 10ª extending to the interior of the piston. The resilient ring 10, mounted in this lowest groove 5, is the oil control or regulating ring embodying my present invention. This ring, as shown in Fig. 1, is provided with a wide channel 12 in its exterior face forming on either side narrow annular ribs or flanges 11 both of which are adapted to engage the cylinder wall. The channel is rectangular in cross-section, it being preferably of uniform depth and width and the facing sides of the flanges 11 being parallel. A series of slots 13, formed in the ring, extend from the channel to the interior periphery of the ring. The slots are in the bottom or lowest zone of the channel and have their lower sides flush with or in the same horizontal plane as the upper side of the lower rib or flange 11. In other words, there are solid oil trapping portions 14 of the channel above the slots 13 but no such portions below the slots.

Figure 3:
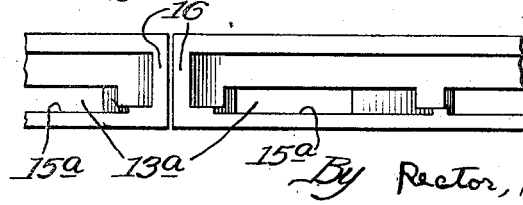
Fig. 3 is a side elevation of part of a ring embodying a modified form of my invention.

In the modified form shown in Fig. 3, the slots 13ª of the oil control ring have their lower portions cut through the lower rib or flange 11 but it will be observed that the lower sides of the slots are in the same plane as the scraping edge or corner portions 15ª of the lower flange 11. The lower side of the channel is thus irregular, but it will be noted that the slots are in the lowest zone of the channel and there are no solid trapping portions between the scraping edge portions 15ª and the slots. Full bridges or cylinder contacting ribs 16 are provided at the joint or ends of the ring. Other full bridges may be provided at other places in the channel if desired, it being unnecessary for the channel to be endless or unbroken.

In operation excess oil on the cylinder is scraped into the wide channel 12 and is conducted by the slots 13 to the back of the ring from whence it drains through the holes 10ª into the interior of the piston and back to the engine crank case. I have found by numerous tests that by having the slots in the lowest zone of the rectangular channel instead of in the middle or upper zone of the channel amazing oil eceonomy is effected and "blow-by" reduced. For example, I have tested in the same engine, under exactly the same conditions, two rings, alike in tension, dimensions, and character of material and workmanship except one had the slots in the middle zone of the channel and the other had the slots in the lowest zone in accordance with my present invention. The ring with the slots in the middle zone was a ring such as has been on the market for a long time and known commercially under the trade-mark "Perfect Circle 85". The engine running at a speed of 2500 R. P. M. (equivalent to 50 miles per hour) and equipped with the ring having the slots in the lowest zone of the channel consumed about 36% less oil than the other ring with the slots in the middle zone. Over the entire operating range of the engine this oil consumption with my improved ring was much less and the "blow-by" was generally less than the other ring with the slots in the middle zone.

Just why my present invention gives such amazing and unexpectable results, I cannot say positively. I know that the wide rectangular channel affords high unit pressure of the cylindrical or outer faces of the flanges against the cylinder wall and that the inner corners 15 and 17 of the flanges serve as scraping edges which scrape the excess oil from the cylinder wall into the wide channel. I am of the opinion that on the down stroke of the piston the oil in the channel is more or less trapped in the upper zone of the channel above the slots, and that on the upper stroke, and particularly at the beginning of that stroke, the oil, due to inertia and possibly to some degree due to gravity and some "blow by", the oil in the channel is carried against or strikes the upper side of the lower flange 11 and flows freely through the slots to the back of the ring. I believe, though I cannot say positively, that this happens because the lower sides of the slots are on the same level as the lower scraping edge 15 or 15ª and there are no solid portions between the slots and the upper sides of the flange 11 as there are in the rings with the slots in a higher zone in the channel.

I claim:

1. In an internal combustion engine, the combination of a cylinder, a hollow piston having an annular groove with apertures extending from the back of the groove to the interior of the piston, and a resilient oil regulating ring mounted in said groove, the piston ring being provided with a wide rectangular channel in the exterior periphery of the ring and between the flat sides of the ring, narrow annular continuous flanges on either side of the channel, the flanges having oil scraping edges and cylindrical faces in contact with the cylinder wall, and a series of slots narrower than the channel and at the bottom or in the lowest zone of the channel and extending through the ring, there being solid portions above the slots and between the slots and the upper flange of the ring and free and unobstructed oil flow from the upper side of the lower flange into said slots.

2. A resilient oil regulating ring provided with a wide rectangular channel in the exterior periphery of the ring and between the flat sides of the ring, narrow annular continuous flanges on either side of the channel, the flanges having oil scraping edges and cylindrical faces in contact with the cylinder wall, and a series of slots narrower than the channel at the bottom or in the lower zone of the channel and extending through the ring, there being solid portions above the slots and between the slots and the upper flange of the ring, and free and unobstructed oil flow on the upper side of the lower flange into said slots, whereby, when said ring is mounted in an annular groove of a hollow piston with apertures extending from the back of the groove to the interior of the piston in an internal combustion engine, the oil flowing into said slots passes to the interior of the piston.

LLOYD CROMIS.